United States Patent [19]
Ceska

[11] 3,882,070
[45] May 6, 1975

[54] PERSULFATE STABILIZED LATICES

[75] Inventor: Gary W. Ceska, Coraopolis, Pa.

[73] Assignee: Arco Polymers, Inc., Glenolden, Pa.

[22] Filed: May 23, 1973

[21] Appl. No.: 363,252

[52] U.S. Cl. .............. 260/29.7 T; 260/29.6 MN; 260/29.6 MQ; 260/29.6 PT; 260/29.7 DP; 260/29.7 N; 260/29.7 NQ; 260/29.7 PT; 260/29.7 SQ; 260/34.2

[51] Int. Cl. .............. C08d 1/22; C08g 53/18

[58] Field of Search ............ 260/29.7 NQ, 29.7 N, 260/29.7 SQ, 29.6 MQ, 29.6 MN, 29.6 PT, 29.7 T, 29.7 PT, 29.7 DP, 34.2

[56] References Cited
UNITED STATES PATENTS

| | | | |
|---|---|---|---|
| 3,324,066 | 6/1967 | Arcangeli et al. | 260/29.7 DP |
| 3,344,103 | 9/1967 | Eilbeck et al. | 260/29.7 T |
| 3,438,926 | 4/1969 | Burke | 260/29.7 N |
| 3,501,432 | 3/1970 | Wright et al. | 260/29.6 |
| 3,668,230 | 6/1972 | Dannals | 260/29.7 N |
| 3,699,069 | 10/1972 | Peaker | 260/29.7 N |
| 3,759,860 | 9/1973 | Peaker | 260/29.7 N |

*Primary Examiner*—Morris Liebman
*Assistant Examiner*—T. De Benedictis
*Attorney, Agent, or Firm*—Lewis J. Young

[57] ABSTRACT

A two-step process for preparing latices containing no emulsifier comprises (1) polymerizing a 30–50% portion of the monomers in aqueous emulsion containing 0.4–1.5 parts of persulfate and 0.5–2.0 parts of N-methylolacrylamide per 100 parts of monomer, and (2) adding the remaining portion of the monomers, 0.4–1.5 parts of persulfate, and 0.5–2.0 parts of N-methylolacylamide per 100 parts of monomer and polymerizing to complete conversion. The latices have unusually good stability to mechanical shear and multivalent ions at low pH. Latices made with large amounts of persulfate but no N-methylolacrylamide are not stable; N-methylolacrylamide by itself has no capacity for stabilizing latices.

4 Claims, No Drawings

PERSULFATE STABILIZED LATICES

BACKGROUND OF THE INVENTION

A primary factor governing the stability of emulsion polymers is the charge on the surface of the dispersed particles. When conventional soaps are the dispersants, this charge arises from the adsorbed soap molecules which are mobile and in dynamic equilibrium with similar molecules in solution.

The presence of the soaps often proves detrimental to the final properties of the latex. Thus, the surfactant tends to reduce the moisture resistance of films or coatings made from the latices made in the presence of soaps. It is likely that surfactants are desorbed from the polymer particle to some extent during coalescense and drying of a latex film. If surfactant migrates to the air/coating interface, subsequent difficulties may be expected with intercoat adhesion, surface discoloration or water sensitivity. Migration of surfactant to the coating/substrate interface can decrease adhesion to the substrate.

It has been found that latices containing internally bound stabilizers are more stable to mechanical shear coagulation than latices containing the adsorbed surfactants because of the differences in the ability of charges to more about the surface of the particles.

Because of these and other problems, it is attractive to consider the possibility of preparing polymer latices which contain a minimum amount of adsorbed surfactant and a maximum amount of stabilizing groups which are not easily removable from the particle surface.

Stable latices have been prepared by copolymerizing styrene with various sulfo-monomers, such as 2-sulfoethyl methacrylate (U.S. Pat. No. 2,914,499) or sodium styrene sulfonate (U.S. Pat. No. 3,306,871) in emulsion. The sulfonic acid groups from the sulfomonomers furnish the desired charges on the surface of the polymer particles.

U.S. Pat. No. 3,501,432 teaches that the use of a persulfate initiator for the preparation of styrene-acrylate copolymers gives mostly hydroxyl end-groups which stabilize the latices produced. However, latices stabilized with hydroxyl groups are not sufficiently stable at low pH for most paper-coating uses.

It would be desirable to produce styrene-butadiene latices stabilized with sulfate end-groups produced by the decomposition of the persulfate initiators. However, the efficiency with which sulfate groups can enter a latex particle is highly dependent upon the method of polymerization. In U.S. Pat. No. 2,847,404, the use of sulfur dioxide with large amounts of persulfate was reported to produce stable latices. Styrene-butadiene latices prepared by the method of U.S. Pat. No. 2,847,404 have been found to be only moderately stable at low pH and have very poor color stability.

The present invention relates to a process for preparing stable latices using persulfate initiator and N-methylolacrylamide as an additive to give polymer particles having sulfate end-groups. The latices so produced are exceptionally stable to both mechanical shear and multi-valent ions at low pH.

SUMMARY OF THE INVENTION

In accordance with the invention, a stable latex is prepared from a total monomeric mixture comprising 30–80% by weight of a conjugated diene, 20–70% by weight of an aryl vinyl monomer, and from 0 to 10% by weight of one or more monomers copolymerizable therewith, such as acrylonitrile, acrylic acid, itaconic acid, acrylamide, fumaric acid, vinylidene chloride, and maleic acid by polymerizing in aqueous emulsion using a persulfate initiator in the presence of methylolacrylamide.

The novel latices are conveniently prepared by a two-step process. In the first step, a 30–50 percent portion of the monomer mixture is added to sufficient water to give a final latex having from 20–35 percent solids and containing persulfate polymerization initiator. N-Methylolacrylamide may be added in this step, or may be added entirely in the second step, as preferred. The resulting emulsion has a pH of from 2–4. The aqueous acidic emulsion is polymerized to from 60–100 percent conversion at a temperature of between 50° and 100° C.

In the second step, the remaining portion of the monomer mixture along with additional persulfate initiator and N-methylolacrylamide are added to the aqueous emulsion and the emulsion polymerized at 50°–100° C. until complete conversion is obtained.

These latices are useful in textile backsizing, paper coating, metal coating, and other uses depending upon the particular chemical composition of the latex.

DETAILED DESCRIPTION OF THE INVENTION

The preferred process of the invention is a two-step procedure that has made possible the production of various surfactant-free latices. With this procedure latices require no anionic or non-ionic surfactants, for stabilization is built into the emulsion particles by means of sulfate groups from the initiator. Among the advantages gained by the use of surfactant-free latices as compared with those containing high amounts of surfactant are improved wet strength and quick set in textile applications, increased foldability in paper saturation applications, and improved color stability on heat aging.

In the first step of the preferred method, a portion of the diolefin, the aryl vinyl monomer, and any other monomers, if used, are emulsion polymerized with the aid of a persulfate initiator. Enough monomers are used to prepare a latex having 20–35% solids. N-Methylolacrylamide may be used in the first step, but its use is optional, not required.

In the second step, the remaining monomers are added along with additional persulfate and the N-methylolacrylamide. This addition may be instantaneous or the addition may be made continuously over a period of time. The polymerization is continued to completion to produce a latex having 35–55% solids.

Examples of conjugated diolefins which may be used are 1,3-butadiene, 2,3-dimethyl-1,3-butadiene, 2-methyl-2,3,-butadiene (isoprene), 2-chloro-1,3-butadiene (chloroprene), piperylene and the like. The diolefins may be present in amounts ranging between 30 and 80% by weight of the total monomer mixture.

The aryl vinyl monomers suitable for use as comonomers with the conjugated diolefins are styrene, substituted styrenes such as methylstyrene, dimethylstyrene, ethylstyrene, chlorostyrene, 2,4-dichlorostyrene, 2,5-dichlorostyrene, and divinyl benezene, alpha-methylstryene, vinyl napthalene, and the like, or mixtures of these monomers. The vinyl monomers may comprise between 20 and 70% by weight of the total monomer mixture.

Up to 10% by weight of the total monomer mixture may be one or more monomers copolymerizable with the above monomers. Suitable monomers are, for example, acrylonitrile, acrylic acid, itaconic acid, fumaric acid, maleic acid, vinylidene chloride, and acrylamide.

The polymerization initiator used to produce the latex of the present invention is a persulfate. Preferably ammonium persulfate is used, as it provides efficient reaction rates and contains a fugitive cation and allows the retention of the amount of electrolytes at a low level. The amount of catalyst used is usually about 0.8 to 3.0% by weight based on total monomer, preferably about 1.0 to 2.0%.

A cocatalyst must be used to prevent the hydrolysis of the persulfate radicals to hydroxyl groups. N-Methylolacrylamide has been found to be useful in amounts of between 1.0 and 4.0% by weight based on monomer. The persulfate decomposes into two sulfate ion radicals. In the absence of a cocatalyst, the sulfate ion radical hydrolyzes to a bisulfate ion and a hydroxyl radical. The hydroxyl radical initiates the polymerization, thus forming a polymer chain having hydroxyl end-groups. Latices formed in this manner are not as stable to mechanical shear or to multivalent ions, such as calcium or aluminum ions, as are polymer latices having sulfate end-groups. In the presence of N-methylolacrylamide, the sulfate ion radicals appear to initiate polymer chains having sulfate end-groups and, thus produce latices which have good stability even at pH 2-6.

It is sometimes advantageous to use in the polymerization a chelating agent such as the tetrasodium salt of ethylenediamine tetraacetic acid. These chelating agents are known in the art for use in emulsion polymerizations and are generally used in an amount of about 0.01 percent based on total monomers.

Chain transfer agents may be used to regulate the average molecular weight of the polymer to a usable range. Those agents preferably used are the long chain alkyl mercaptans such as t-dodecyl mercaptan or tridecyl mercaptans. Other useful chain transfer agents may be used such as the lower alkyl xanthogens, alphabromoethylbenzene, and carbon tetrabromide. The amount of chain transfer agent varies according to the transfer activity of the particular agent and is readily determined by one skilled in the art.

The polymerization is preferably carried out in two steps. The first step is carried out in aqueous acidic emulsion, the amount of water being varied according to the solids content desired in the final latex. Generally preferred is a ratio of water to monomers such that a latex having a total solids content of from about 15 to 40 percent is produced. The preferred range of solids is from 20 to 35 percent.

In the first step, a 30-50 percent portion of the monomers are added to sufficient water to prepare a latex containing 20-30 percent solids. To this mixture added the chelating agent, chain transfer agent, 0.5 to 2.0% by weight of N-methylolacrylamide, and 0.4-1.5 percent by weight of the initiator based on the portion of monomers used. The resulting mixture usually has a pH of 2-4.

The polymerization is carried out at a temperature conventionally used in polymerization, such as between 50° and 100°C., preferably at a temperature of 60°-80° C. until between 60 and 100 percent conversion is attained. The preferred conversion to which this step is carried may depend on the monomers being polymerized. Thus, if a cross-linkable monomer such as butadiene is being polymerized, a more soluble polymer is formed at conversions of 60-70 percent. With most monomer systems, preferred conversion is 100 percent.

Upon completion of this step in the polymerization, the resulting latex is a seed latex containing 20-35 percent solids.

In the second step, the remaining 50-70 percent by weight portion of the monomers is added to the seed latex, along with an additional 0.4 - 1.5 percent by weight of the initiator and 0.5 - 2.0 percent of N-methylolacrylamide based on the monomer. Additional water may be added if necessary to produce a latex having the desired solids content. The polymerization is then resumed at a temperature between 50° and 100° C. until complete conversion of the monomers to polymer latex is achieved to form a latex having solids content of between 30-65 percent, preferably between 35 and 55 percent.

The invention is further illustrated by the folowing examples, in which all percentages are percent by weight unless otherwise specified.

EXAMPLE I

To each of five 32 oz. crown capped polymerization bottles was added 32 g. of styrene, 25 g. of butadiene, 7 g. of acrylonitrile, 3.0 g. of ammonium persulfate and 220 g. of water. The bottles were capped and heated at 77° C. for 7 hours to polymerize the mixtures. The bottles were then cooled to room temperature and opened. The resulting latices had about 28% solids and a pH of about 2.5. There was added to each bottle, an additional 2.0 g. of ammonium persulfate (to bring total to 2.5 parts per hundred parts of monomer) and the amounts and kinds of monomers shown in the Table I. The bottles were then recapped and heated at 77° C. for an additional 6 hours to obtain latices having the percent solids shown. The latices were adjusted to a pH of about 5 and tested for stability to mechanical agitation and to calcium ion.

Mechanical stability was determined by subjecting the latex to shearing agitation in a laboratory mixer for 30 minutes (or until coagulation occurred). Latices which could be stirred for the full 30 minutes without any curd formation were rated OK.

Calcium ion stability was determined by adding 5 ml. of a 10% aqueous solution of calcium chloride to 100 ml. of the latex and measuring the amount of curd formed. The percent curd is the ratio of dried curd to the total dried solids in the latex.

To determine the paper saturation properties of the latices, paper was saturated with the latex and cured 10 minutes at 150° C.

Table I

| Run No. | 1 | 2 | 3 | 4 | 5 |
|---|---|---|---|---|---|
| Monomer added in Step 2, g. | | | | | |
| Styrene | 83.4 | 69.5 | 69.5 | 69.5 | 69.5 |
| Butadiene | 55.6 | 55.6 | 55.6 | 55.6 | 55.6 |
| Acrylonitrile | — | 13.9 | 13.9 | 13.9 | 13.9 |
| Acrylamide | — | 4.0 | — | 2.0 | — |
| Acrylic Acid | — | — | — | — | 4.0 |
| N-Methylolacrylamide | — | — | 4.0 | 2.0 | — |

Table I-Continued

| Run No. | 1 | 2 | 3 | 4 | 5 |
|---|---|---|---|---|---|
| Evaluation of Latex | | | | | |
| Solids, % | 49.0 | 49.4 | 49.5 | 49.7 | 49.2 |
| pH | 4.9 | 5.8 | 5.1 | 5.6 | 4.9 |
| Stability (30 min.) | Coag. 2 min. | Coag. 22 min. | OK | OK | Trace Curd |
| $Ca^{++}$ Stability, % Curd | 40 | 38 | nil | nil | 20 |
| | | | | | |
| Paper Saturation Tensile(psi) | | | | | |
| Dry | 2600 | 2600 | 3100 | 3100 | 2800 |
| Wet | 1600 | 1500 | 2200 | 1800 | 1300 |
| DOP | 1900 | 1900 | 2600 | 2300 | 1700 |
| Flex | 67 | 36 | 70 | 99 | 79 |

Run No. 1 shows that up to 2.5% persulfate, based on total monomers, did not produce a stable latex in the absence of the N-methylolacrylamide.

The results show that N-methylolacrylamide, in Runs 3 and 4, produced outstanding mechanical and calcium ion stability, and enhanced the paper saturation properties of the latex. A large increase in dry tensile, wet strength, and resistance to dioctyl phthalate (DOP) was produced by the N-methylolacrylamide.

Acrylamide had a slight effect on the mechanical stability but little or no effect on the calcium ion stability. Acrylic acid improved the mechanical stability, but the calcium ion stability was still poor.

Thus, of these water-soluble monomers, only N-methylolacrylamide was satisfactory in the process of the invention.

When the above recipes were repeated using 0.3% ammonium persulfate based on total monomers instead of the above 2.5% persulfate, the latices all coagulated during the polymerization due to instability.

EXAMPLE II

The two-step process of Example I was repeated using the ingredients and amounts thereof shown in Table II in steps 1 and 2. The evaluations of the resulting latices are given in the Table.

Table II

| Run No. | 1 | 2 | 3 | 4 | 5 |
|---|---|---|---|---|---|
| Step I, g. added | | | | | |
| Styrene | 32 | 32 | 32 | 39 | 39 |
| Butadiene | 25 | 25 | 25 | 25 | 25 |
| Acrylonitrile | 7 | 7 | 7 | — | — |
| Persulfate | 3 | 3 | 3 | 3 | 3 |
| N-Methyloloacrylamide | — | — | 2 | — | 2 |
| Water | 220 | 220 | 220 | 220 | 220 |
| | | | | | |
| Step II, g. added | | | | | |
| Styrene | 69.5 | 69.5 | 69.5 | 85 | 85 |
| Butadiene | 54.3 | 54.3 | 54.3 | 54 | 54 |
| Acrylonitrile | 15.2 | 15.2 | 15.2 | — | — |
| Persulfate | 2 | 2 | 2 | 2 | 2 |
| N-Methyloloacrylamide | — | 4 | 4 | 4 | 4 |
| | | | | | |
| Evaluations of Latex | | | | | |
| Solids, % | 49.0 | 48.2 | 47.5 | 47.0 | 48.0 |
| pH | 4.9 | 5.2 | 5.0 | 5.5 | 5.0 |
| Stability (30 min.) | Coag. 2 min. | OK | OK | OK | OK |
| $Ca^{++}$ stability, % Curd | 40 | nil | nil | nil | nil |
| | | | | | |
| Paper Saturation Tensile (psi.) | | | | | |
| Dry | 2600 | 3000 | 3500 | 3300 | 3500 |
| Wet | 1600 | 2000 | 2300 | 2100 | 2000 |
| DOP | 1900 | 2300 | 2600 | 2500 | 2600 |
| Flex | 67 | 45 | 75 | 184 | 136 |

Run 1, again, shows that the use of 2.5% persulfate, based on monomers, gives unstable latex in the absence of N-methylolacrylamide. Runs 2 and 3 show that the use of persulfate with N-methylolacrylamide gives a latex having good stability, and that the N-methylolacrylamide may be used in both steps (as in Run 3) or only in step 2 (as in Run 2). The results of Runs 4 and 5 are included to show that the same results are obtained in the absence of acrylonitrile. Even though the acrylonitrile is a moderately water-soluble monomer, it does not enhance the stability of the latex in the absence of N-methylolacrylamide.

EXAMPLE III

To each of five 32-oz. crown capped bottles was added 36 g. of styrene, 26 g. of butadiene, 2 g. of acrylonitrile, 1.5 g. of N-methylolacrylamide, 220 g. of water, and the amounts of ammonium persulfate shown in Table III under step 1. The bottles were capped and heated at 77° C. for 7 hours to polymerize the mixtures. The bottles were then cooled to room temperature and opened. The resulting latices had about 28% solids and a pH of about 2.5. There was then added to the latices, 83.5 g. of styrene, 55.5 g. of butadiene, 4. of N-methylolacrylamide (total of 2.75 parts per hundred parts of monomer), and the amounts of persulfate shown in the Table under step 2. The bottles were recapped and heated at 77° C. for an additional 6 hours to obtain latices having a pH of 4.5 and the properties shown in the Table.

Table III

| Run No. | 1 | 2 | 3 | 4 | 5 |
|---|---|---|---|---|---|
| Parts Persulfate per 100 parts monomer | | | | | |
| Step 1 | 1.0 | 1.0 | 0.5 | 0.5 | 1.0 |
| Step 2 | 1.0 | 0.5 | 1.0 | 0.5 | — |
| TOTAL | 2.0 | 1.5 | 1.5 | 1.0 | 1.0 |
| | | | | | |
| Latex Properties | | | | | |
| Mech. Stability, 30 min. | OK | OK | OK | OK | OK |
| $Ca^{++}$ Stability, % Curd | 0 | 0 | 0 | Trace | 14 |
| | | | | | |
| Paper Saturation Tensile: | | | | | |
| Dry | 3000 | 3000 | 3000 | 3100 | 3000 |
| Wet | 1900 | 2000 | 1900 | 1900 | 1800 |
| DOP | 2300 | 2200 | 2400 | 2100 | 2000 |
| Flex | 90 | 198 | 152 | 214 | 306 |

The lowest concentration of persulfate used was 1%. At this level, excellent mechanical stability is still maintained and if the persulfate addition is divided, 50% added in Step 1 and 50% in Step 2, calcium ion stability is also preserved. However, if all 1% persulfate is added in Step 1 (see Run 5), some decrease in calcium ion stability is observed.

EXAMPLE IV

To a 10-gallon stainless steel reactor was added 3,600 g. of styrene, 2,400 g. of butadiene, 12,750 g. of water, 125 g. of 60% N-methylolacrylamide and 150 g. of ammonium persulfate. This mixture was polymerized for 5 hours at 80° C. To the resulting seed latex was added 5,400 g. of styrene, 3,600 g. of butadiene, 740 g. of water, 500 g. of 60% N-methylolacrylamide, and 150 g. of ammonium persulfate. The mixture was polymerized for an additional 10 hours at 80°C. to give a surfactantfree latex having 50% solids, a pH of 3.0, and good stability to mechanical shear and calcium ions.

This identical procedure, omitting the N-methylolacrylamide in both steps, gave coagulated product rather than a stable latex.

EXAMPLE V

The procedure of Example IV was repeated several times except that an additional monomer was added during the first step addition. Thus, 1% by weight of acrylamide, 1% by weight of itaconic acid, or 1% by weight of acrylic acid was added along with the styrene, butadiene, N-methylolacrylamide, and persulfate.

In each case, latices were obtained having good stability as in Example IV. Again when the N-methylolacrylamide was omitted, the emulsions coagulated during the second polymerization and no latices were obtained.

What is claimed is:

1. A process for preparing surfactant-free latex from a total monomeric mixture comprising 30–80 parts per 100 parts of mixture of a conjugated diolefin, 20–70 parts per 100 parts of mixture of aryl vinyl monomer, and 0–10 parts per 100 parts of mixture of one or more monomers copolymerizable therewith, said process comprising:
   a. forming an aqueous acidic emulsion of about 30–50 percent by weight of the monomeric mixture in water containing 0.4 to 1.5 parts of a persulfate polymerization initiator and 0.5 to 2.0 parts of N-methylolacrylamide per 100 parts of monomer; said water being used in an amount such that the total solids content of the resulting latex will be 20–30 percent;
   b. polymerizing said aqueous acidic emulsion at a temperature of 50°–100°C. to essentially complete conversion to form a latex;
   c. adding to said latex the remaining 50–70 percent by weight portion of the monomer mixture, an additional 0.4 to 1.5 parts of persulfate initiator, and 0.5 – 2.0 parts of N-methylolacrylamide per 100 parts of monomer; and
   d. polymerizing the resulting mixture in aqueous emulsion at a temperature of 50°–100°C. to complete conversion to form a latex having from 35–55 percent solids, said latex being stable to mechanical shear and multivalent cations at pH 2.0 – 6.0.

2. The process of claim 1 wherein the total monomer mixture consists of 50–70% by weight of styrene and 30–50% by weight of butadiene.

3. The process of claim 1 wherein the total monomer mixture consists of 60 parts of styrene, 40 parts of butadiene, and 3–7 parts of acrylonitrile.

4. In a process for preparing styrene-butadiene latices in the absence of added emulsifier and in the presence of a persulfate catalyst, by emulsion polymerization at a temperature of 50°–100°C.; the improvement comprising adding to the emulsion from 0.8 to 3.0 parts of a persulfate catalyst and 0.5 to 4 parts of N-methylolacrylamide per 100 parts of monomer, whereby latices having good mechanical and calcium ion stability at pH 2.0–6.0 are produced.

* * * * *